Sept. 2, 1969      J. E. McWILLIAMS      3,464,571
APPARATUS FOR LOADING BAGGED MAIL FROM A LOADING
DOCK INTO A HIGHWAY VEHICLE
Filed Jan. 31, 1968      4 Sheets-Sheet 1
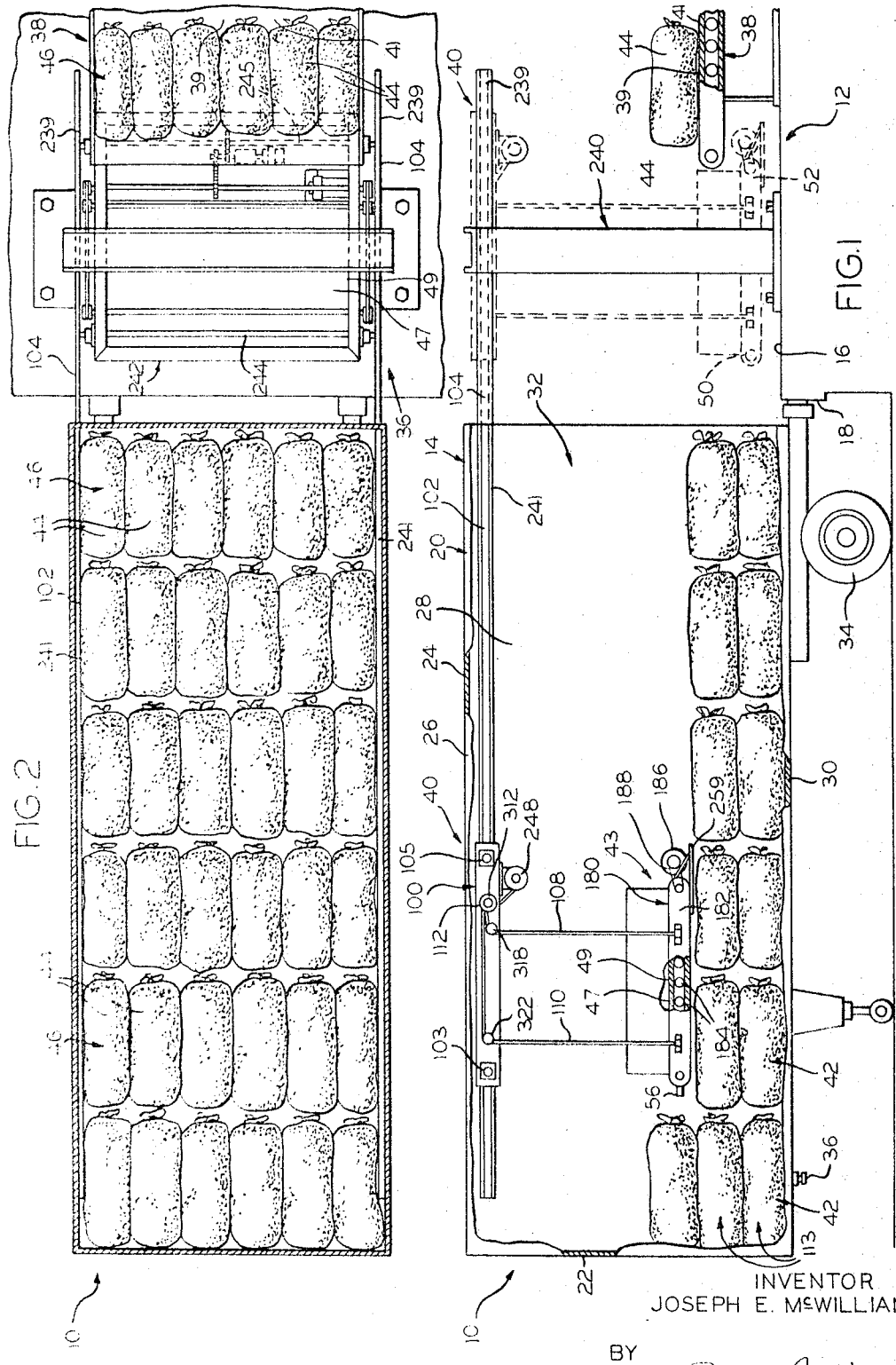
INVENTOR
JOSEPH E. McWILLIAMS
BY
Mann, Brown McWilliams
ATTORNEYS Sept. 2, 1969   J. E. McWILLIAMS   3,464,571
APPARATUS FOR LOADING BAGGED MAIL FROM A LOADING
DOCK INTO A HIGHWAY VEHICLE
Filed Jan. 31, 1968   4 Sheets-Sheet 3

INVENTOR
JOSEPH E. McWILLIAMS

BY
Mann Brown & McWilliams
ATTORNEYS

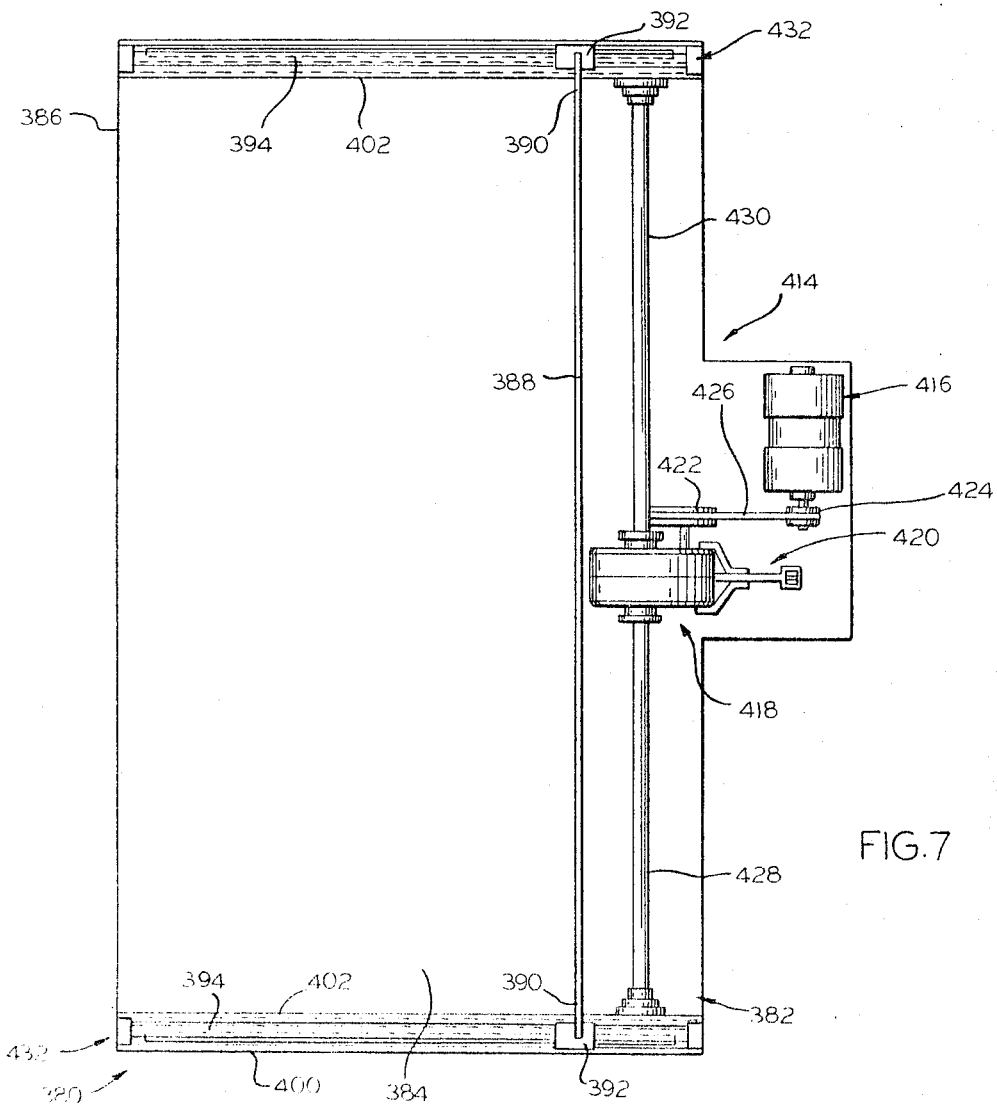
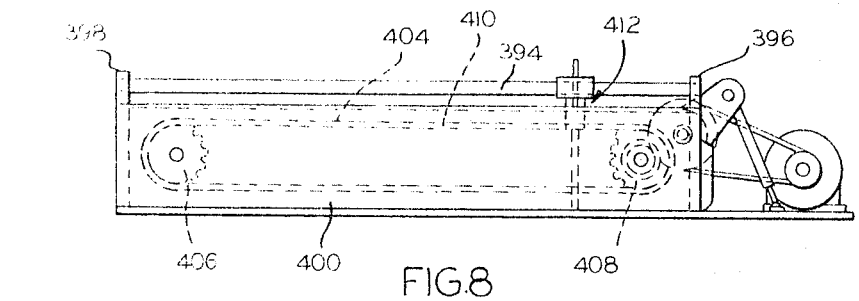

United States Patent Office 3,464,571
Patented Sept. 2, 1969

3,464,571
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Continuation-in-part of application Ser. No. 694,151, Dec. 28, 1967. This application Jan. 31, 1968, Ser. No. 702,007
Int. Cl. B65g 65/00, 67/00
U.S. Cl. 214—6   7 Claims

ABSTRACT OF THE DISCLOSURE

The invention relates to the loading of mail bags from a loading dock into an end loading highway vehicle, such as a truck or a trailer, to fully load the vehicle with stacks of mail bags in which the bags are compactly loaded into place in individual stack forming tiers without those performing the bag loading operation having to enter the vehicle. In practicing the invention, the loading dock at the post office or the like is provided with a conveyor on which out-going bags are placed and oriented in closely spaced tier form. Operating between the conveyor and the highway vehicle is an overhead, self-propelled carriage carrying a vertically movable load support that receives the tier load without disturbing the orientation of the bags and brings the tier load into the vehicle loading area for discharge of the stack forming tier unit, and effects placement of the tier as part of a stack in the vehicle, again without disturbing the orientation of the bags. The carriage then returns to the conveyor for another tier load.

The carriage movements are controlled so that the individual tier loads are formed into vertical stacks of mail bags that are disposed to position the bags of adjacent stacks in closely spaced relation, with the vehicle being thus filled with bags throughout its load receiving area so as to make maximum use of the available loading space within the vehicle to maximize the pay load. The operation of the carriage is mechanized so that workers do not have to go into the vehicle, and palleting of the bags in groups is avoided while still achieving uniform loading in tier form.

Several specific arrangements for practicing the invention are disclosed wherein the bags as loaded extend either longitudinally or transversely of the vehicle.

---

This application is a continuation-in-part of my application Ser. No. 694,151, filed Dec. 28, 1967.

This invention relates to a method and apparatus for loading bagged mail from a loading dock into a highway vehicle, and more particularly, to methods of and means for facilitating the handling of bagged mail in tiered groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Department and others concerned with the transport of loaded mail bags, load something on the order of 50,000 trucks a day in the U.S.A. in this manner at a cost on the order of $18.00 a truck, which gives an indication of the magnitude of the problem.

My Patent 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

The present application is directed to the specifics of the arrangement shown in FIGURES 6 and 7 of my said application and modifications thereof.

A principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that permits substantially automatic handling of the mail in tiered load groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

3

In the drawings:

FIGURE 1 is a diagrammatic side elevational view of a semi-trailer in the process of being loaded in accordance with my present invention, with parts being broken away, and the mail bag tier carrying carriage being shown in its load receiving position in its dashed line position while its full line position shows one of the load discharging positions thereof;

FIGURE 2 is a plan view of the apparatus shown in FIGURE 1, with the suspended carriage being shown in its load unit receiving position;

FIGURE 7 is a view similar to that of FIGURE 5 but illustrating yet another form of unit load support, and FIGURE 8 is a side elevational view of the load support of FIGURE 7.

Figure 3:
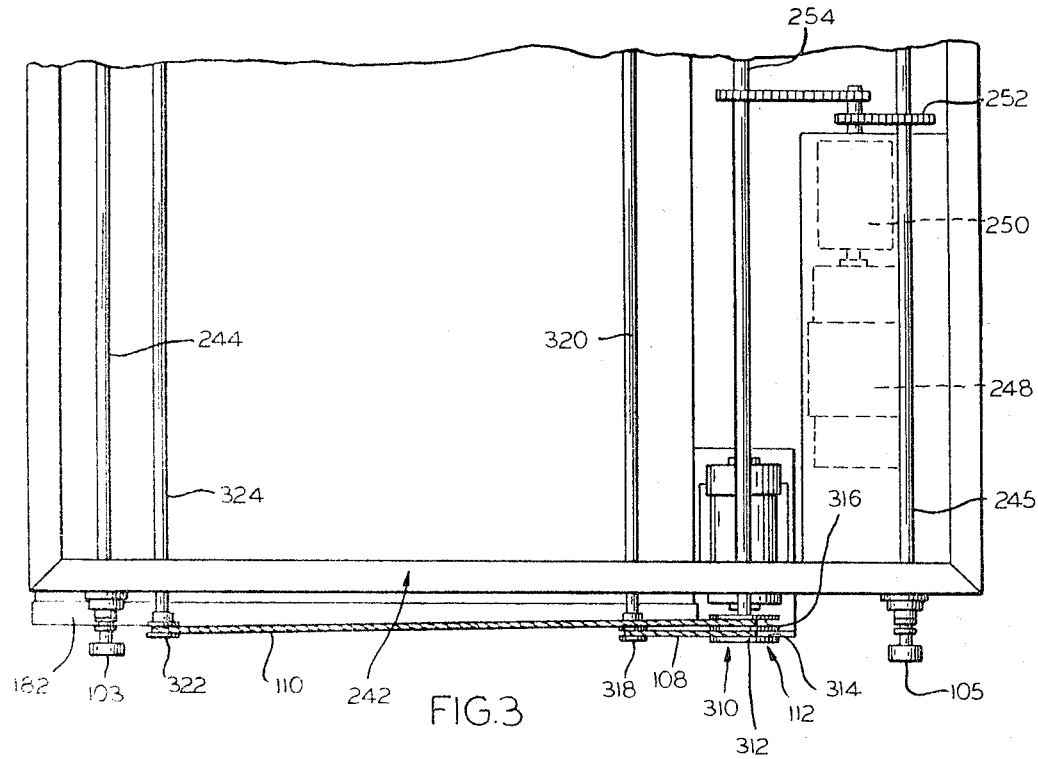
FIGURE 3 is a fragmental plan view of the carriage and load unit support that is suspended therefrom, in accordance with this invention.
Figure 4:
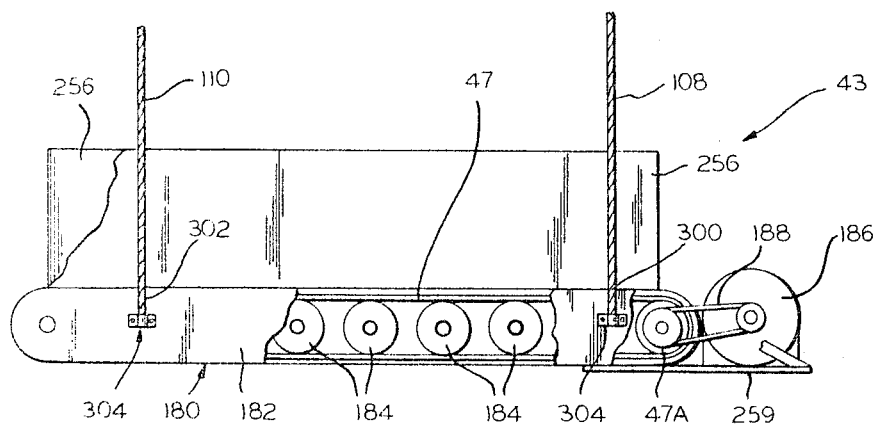
FIGURE 4 is a side elevational view of the suspended mail bag support of FIGURES 1–3.

However, it is to be distinctly understood that the specific embodiments of the invention illustrated are supplied primarily to comply with the requirements of the patent code, and that the invention may have other embodiments.

GENERAL DESCRIPTION

Reference numeral 10 of FIGURE 1 generally indicates one embodiment of the present invention that incorporates the basic approach of the present invention for loading mail bags from a loading dock 12 into an end loading vehicle 14, which has been illustrated as being in the form of the familiar simi-trailer, although the invention is readily applicable to any end loading vehicle.

It is assumed that the mail bag handling installation involved includes the loading dock 12 (of a post office or the like) that is conventionally provided with a level load support surface 16 and the usual shoulder or end 18 against which the vehicle 14 is backed up for purposes of being loaded.

It is also assumed that the vehicle 14 be in the form of the usual body 20 difined by forward end wall 22, top wall 24, side walls 26 and 28, floor 30, and end opening 32 that is customarily closed by suitable doors or the like (not shown). The body 20, being of the semi-trailer type, rides on the usdal rear wheels 34 and is provided with the usual kingpin 36 for connection to the fifth wheel of a conventional tractor truck (not shown).

In accordance with this invention, there is associated with the loading dock 12 at the position 36 where the vehicle body 14 is to be stationed for loading purposes a mail bag receiving conveyor 38 and a mail bag tier conveying carriage or carrier 40, which receives the mail bags accumulated in tier form on conveyor 38, transports them into the vehicle 14 and discharges them in tier form to form mail bag stacks 42.

Under ordinary circumstances, the loading dock 12 is located at a post office or the like where loaded mail bags are processed for shipment to their destinations and as indicated in FIGURE 2, the conveyor 38 and the carriage 40 are longitudinally aligned with the vehicle 14 (in the loading position of the vehicle) and have a width transversely thereof to accommodate enough mail bags laid side by side in a row to form one complete tier of a stack 42, such that when the tier is placed within the vehicle 14, it will extend substantially from one side wall 26 to the other side wall 28 as indicated in FIGURE 2. Conveyor 38 is in the form of conveyor belt 39 defining a substantially horizontal loading supporting surface 41 on which the bags 44 are placed, which surface is at an easy reach height above surface 16, such as two to three feet high. Carriage 40 carries a load support in the form of conveyor 43 suspended therefrom, which conveyor 43 is in the form of a conveyor belt 47 defining load support surface 49.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriage 40. In accordance with this invention, the controls for conveyor 38 and carriage 40 including its conveyor 43 are arranged so that these pieces of apparatus are operated without anyone having to go into the vehicle 14, as will be hereinafter described in connection with each of the embodiments of the invention illustrated in the drawings. For this purpose, the controls may be of the push button type applied to suitable control panel 35 and may be of any suitable electric and/or electronic type that will serve the purpose.

In the specific form of FIGURES 1–4, the carriage 40 is in the form of a trolley 100 that operates in trackways 102 and 104 that are mounted on the vehicle and loading dock 12, respectively, on either side of the path of movement of the carriage 40 and are adapted to be aligned and placed in substantial abutting relation when the vehicle 14 is backed into its load receiving relation with respect to loading dock 12. The trolley 100 includes rollers 103 and 105 that ride in the respective trackways so that the carriage 40 can move between the dashed and full line positions of FIGURE 1. The rollers 105 are driven in any suitable manner and the conveyor 43 is supported by cables 108 and 110 on either side thereof that are connected to a powered reel 112 for simultaneously winding and unwinding them as it is necessary to raise and lower the carriage 40 in the practice of my invention.

To practice my invention, after the vehicle 14 is positioned as shown in FIGURES 1 and 2 for loading (assuming it is empty), and the bags to be shipped are disposed, for instance in a pile or piles adjacent the conveyor 38, the worker or workers in the area of conveyor 38 pick up and position enough of the individual bags 44 to form one or more tiers 46 (of six to eight bags in a tier) on the belt 39 of conveyor 38 in which, in accordance with the procedure contemplated by this embodiment of the invention, the bags of each tier 46 are placed in closely-spaced side by side relation and extend longitudinally of the conveyor 38 and vehicle 14.

When one or more tiers 46 have been applied to conveyor 38 in the manner indicated (which tiers are termed a "partial transport vehicle load depth unit" in the appended claims), the carriage 40 is positioned as shown in dashed lines of FIGURE 1, and the conveyor 38 is actuated to deposit simultaneously all the bags 44 forming the first tier 46 on the carriage conveyor 43. The carriage conveyor 43 is simultaneously actuated to move the first tier down to a position adjacent its forward end 50, it being noted that the rear end 52 of the conveyor 43 is disposed in load receiving relation with respect to the forward end 54 of the conveyor 38.

The carriage 40 is then actuated to move same from the dashed line position of FIGURE 1 into the vehicle 14 where it moves toward the front wall 22 of the vehicle to start the first stack of mail bags. Assuming that the vehicle 14 is completely empty, the carriage 40 moves forwardly of the vehicle 14 until its forward end 50 engages the wall 22, which actuates a suitable limit switch arrangement such as that indicated at 56 to stop the forward movement of the carriage 40 and actuate conveyor 43 as well as reverse the movement of the carriage 40 in such a manner that as the carriage 40 moves rearwardly of the vehicle 14, the first tier 46 of bags 44 is conveyed forwardly at a similar speed (for a net speed of zero relative to vehicle 14), and is dropped onto the floor 30 of the vehicle adjacent the end wall 22 in the position indicated at 58.

The carriage 40 is then returned to the dashed line position of FIGURE 1 to receive the next tier 46 of mail bags 44, which can be formed on to the conveyor 38 while the carriage 40 is operating in the manner that has just been described. This next tier is then unloaded in a similar manner to place same on top of the first tier, that is, in the position indicated at 60 in FIGURE 1 of my said application. The carriage is then reloaded and unloaded in a similar manner to dispose succeeding tiers where indicated at 62 and 64 of my said application, respectively, the carriage conveyor 43 being elevated as required for any unloading operation to place succeeding tiers on top of those already in place.

The tiers are consecutively stacked similarly to form the first completed stack 42 adjacent the wall 22, after which the stacking process is repeated to form the next adjacent stack 42. This process is repeated until the stacks 42 have been formed the length of vehicle 14, after which the vehicle open end 32 is secured in the usual manner and the vehicle 14 driven off to be replaced by a similar vehicle 14 to be loaded. Where it is desired to stack two tiers at a time, the conveyor 43 is made of adequate length to simultaneously support two tiers, and the process indicated above practiced but on a dual tier basis, as suggested in my said application.

Alternately, the stacks 42 may be formed by filling in the vehicle 14 by consecutively forming horizontally disposed layers 113 of tiers 46, as indicated in FIGURE 1 of the present application. In doing this, the entire load of conveyor 43 is discharged in one continuous movement thereof rearwardly of the vehicle, after which carriage 40 is returned for another load unit of bags 44.

The handling of the bags in moving them from the conveyor 38 to their respective positions in the vehicle 14 is thus carried out after having made a single orientation of the bag as to the position it is to take in a particular stack forming tier, and without having to drop the bag over the 24 inch limitation provided for by Post Office regulations.

From the description so far there are several important features to be observed. Note for one thing that the bags 44 are properly oriented in their tiers 46 by their application to the conveyor 38, and that this orientation is maintained throughout the further handling of the bags that moves them into stacked relation in the vehicle 14. Furthermore, the lifting and positioning of the bags 44 onto conveyor 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14, and palletizing of the individual tiers 14 is unnecessary.

SPECIFIC DESCRIPTION

The trackways 104 that support trolley 100 on dock 12B comprise channel members 239 that are mounted on a suitable supporting framework 240 that is of generally U-shaped configuration so that the conveyor 43 of carriage 40 may be moved to the low level dashed line position of FIGURE 1 for ready unloading of the conveyor 38 onto the conveyor 43. The trackways 102 comprise channel members 241 secured to the side walls 26 and 28 of vehicle 14 for horizontal alignment with the respective channels 239 when the vehicle 14 is backed into its loading position. The rear wheels 34 of the vehicle 14 may be equipped with a suitable air spring arrangement or the like adapted to achieve exact vertical alignment of the adjacent ends of the respective channels 239 and 241 when vehicle 14 is backed to its loading position. Suitable bridge pieces (not shown) may be applied between such ends of channels 239 and 241 to facilitate the ready movement of trolley 100 between trackways 102 and 104.

The trolley 100, which in the full line position of FIGURE 2 is shown in the dashed line position of FIGURE 1, comprises a suitable frame 242 provided with suitable cross shafts 244 and 245 with which the respective rollers 103 and 105 are operably associated, rollers 105 being keyed to the shaft 245 that is driven by suitable electric motor 248. Motor 248 operates through suitable transmission 250 which selectively drives the shaft 245 through the sprocket and chain drive indicated at 252, or the shaft 254 that is keyed to the reels 112 (through the chain and sprocket drive indicated at 255) for simultaneous winding and unwinding cables 108 and 110 to raise and lower the conveyor 43.

The conveyor 43 comprises a suitable frame 180 including side pieces 182 joined together in any suitable manner that journal rollers 184 that support the belt conveyor 47. Belt conveyor 47 is driven by suitable electric motor 186 that drives the conveyor end pulley 184A adjacent same through suitable pulley belt 188.

The conveyor 43 in the form shown includes upright guide plates 256 on either side of the frame between which the bags 14 forming the individual tiers 46 are disposed. The motor 186 is supported on suitable support plate 259 that is fixed to frame 180 in any suitable manner.

The free ends 300 and 302 of the respective cables 108 and 110 on either side of the conveyor 43 are affixed to the respective side pieces 182 by suitable anchoring devices 304. At their other ends, the cables 108 and 110 are suitably connected to the powered reel 112, which in the form illustrated comprises the shaft 254 having keyed to either end thereof a reel device 310 in the form of a pulley 312 defining a first pulley portion 314 to which the cable 108 is anchored and a second pulley portion 316 to which the cable 110 is anchored. The cables 108 on either side of frame 242 are trained over bend pulleys or rollers 318 that are respectively keyed to shaft 320 journalled in the frame 242, while the cables 110 are similarly trained over similar bend pulleys or rollers 322 keyed to a shaft 324 similarly journalled in frame 242, in the manner suggested in FIGURES 1 and 3.

The load support and discharging function served by the conveyor 43 does not require a belt conveyor as such, as indicated by FIGURES 5–8.

Figure 5:
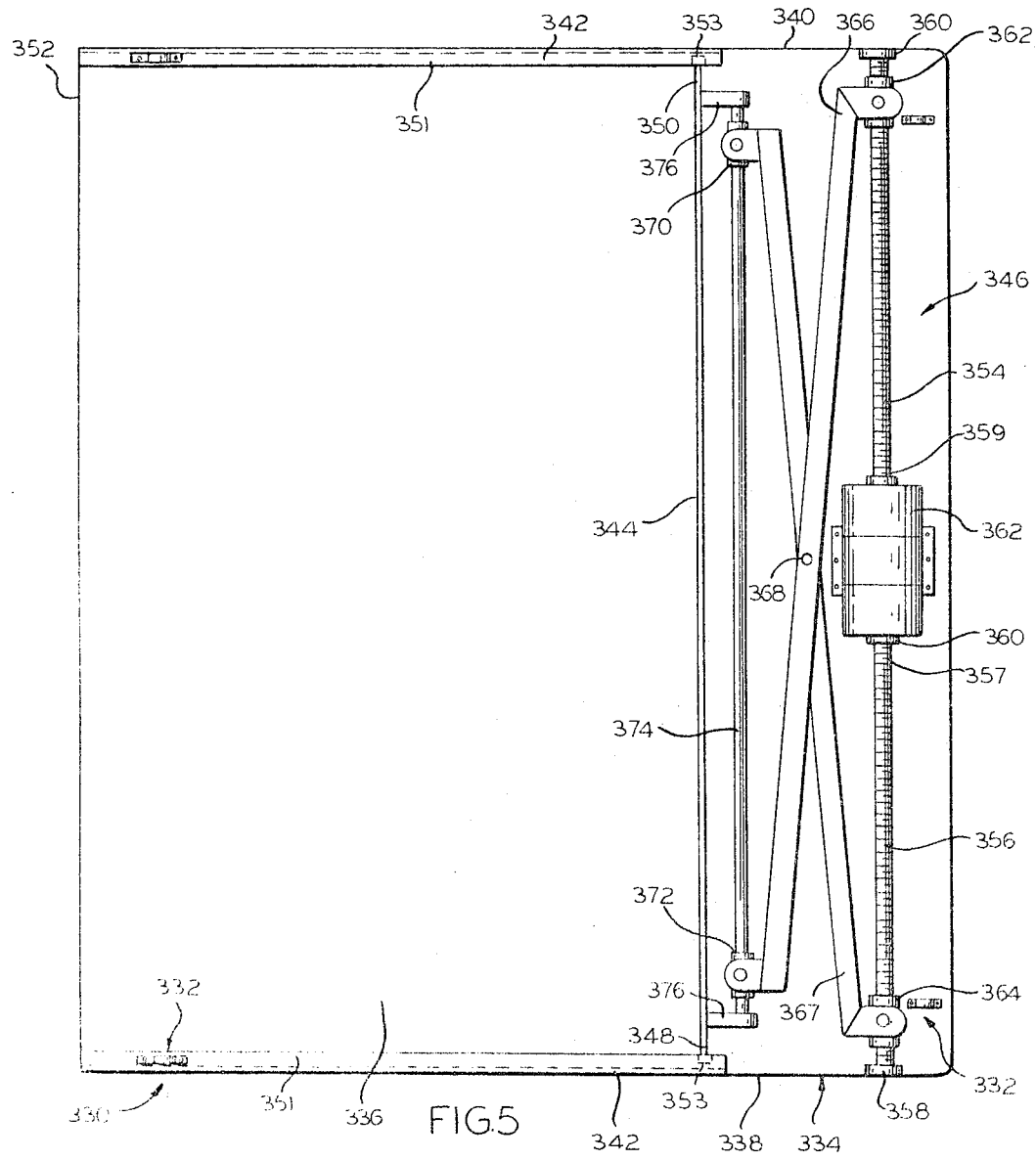
FIGURE 5 is a plan view of a modified form of load unit carrying support adapted for suspension from the carriage.
Figure 6:
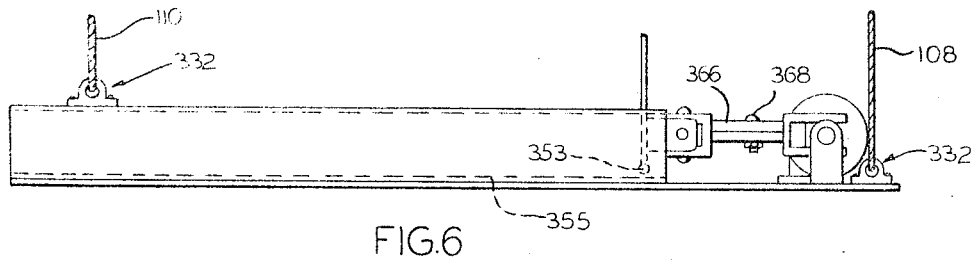
FIGURE 6 is a side elevational view of the load unit carrying support of FIGURE 5.

FIGURES 5 and 6 illustrate a load support device 330 that may be substituted for the conveyor 43 by having the ends of cables 108 and 110 suitably secured to appropriate anchoring devices 332, as suggested in FIGURE 6. Load support 330 comprises a platform 334 defining a planar upwardly facing load support surface 336 between its sides 338 and 340. Secured to either side of platform 334 are guide plates 342 between which extends a pusher plate 344 that is actuated by the actuating mechanism 346 to discharge a tier of bags, that has been disposed on the platform 334 between side plates 342, from the load support 330 in performing the mail bag loading procedure that has already been described.

The pusher plate 344 at its ends 348 and 350 extends under an upper flange 351 of the respective guide plates 342 and is provided with a roller 353 riding on the lower flanges 355 thereof; pusher plate 344 is operably connected to the actuating mechanism 346 in the manner suggested by FIGURE 5 to be moved from the retracted position of FIGURES 5 and 6 to a position adjacent the forward end 352 of platform 334.

The actuating mechanism 346 comprises oppositely threaded shaft members 354 and 356 suitably journalled on the platform 334, as between suitable brackets 358 and 360, for rotation by suitable drive motor 362 to which the adjacent ends 357 and 359 are coupled. The respective shafts 354 and 356 each carry the respective nut members 362 and 364 that are pivotally connected to angled lever arms 366 and 367, respectively, which are pivotally connected together as at 368, and are respectively pivotally connected to collars 370 and 372 which are fixed to either end of a rod 374 that is secured to the rearward side of pusher plate 344 by suitable brackets 376.

FIGURES 7 and 8 illustrate another form of load support 380 that may be used in place of the conveyor 43, which comprises platform 382 defining planar upwardly facing load support surface 384 on which a mail bag load unit is placed. Mounted on platform 382 for reciprocation between the retracted position of FIGURE 7 and the extended position adjacent the front edge 386 of the platform is a pusher plate 388, which at each of its ends 390 is secured to a trolley member 392 slidably mounted on a guide bar 394 that is secured between upstanding end plates 396 and 398 that are applied to platform 382 between a pair of frame plates 400 and 402 on either side of the platform 382, between which is mounted a drive chain 404 that is trained over sprockets 406 and 408 that are journalled between the respective plates 400 and 402 of each side of the platform 382. The trolley members 392 are each secured to the upper run 410 of the respective chains 404 by a suitable connecting device indicated at 412, which may be of any suitable character.

The chains 404 are driven through suitable drive mechanism 414 which comprises suitable electric motor 416 driving a suitable reducer 418 (that is braced by a suitable stabilizer arrangement 420) through pulleys 422 and 424 connected by pulley belt 426, which reducer 418 drives the respective shafts 428 and 430 that are journalled between the reducer 418 and the respective plates 402 and extend within the respective pairs of plates 400 and 402 for keying to the respective sprockets 406.

The plates 396, 398, 400 and 402 on either side of the platform 382 define a guide plate structure 432 between which the aforedescribed unit load of mail bags forming a tier is disposed when the support 380 is being loaded.

The supports 330 and 380 are loaded in a manner similar to that described in connection with the embodiment of FIGURE 1, the respective load support platforms 334 and 382 being lowered as is necessary to dispose the forward end of conveyor 38 over the respective drive mechanisms 346 and 414, with the respective pusher plates 344 and 388 being in their illustrated retracted positions. After the respective load supports are moved to the unloading position, the respective drive mechanisms 346 and 414 are operated to move the respective pusher plates 344 and 388 to the left of FIGURES 6 and 8, respectively, to unload as a unit the mail bags making up the tier load that has been previously described. These operational steps may be performed as part of the over-all procedures that have been previously outlined in detail with regard to the loading of the mail bags into the vehicle 14.

For all embodiments of the invention, the operations of the conveyors and bag carrying carriages are operated from a control panel 35, or the like, located outside of the vehicle, through any suitable wiring arrangement, and ordinarily only a single operator will be needed to both load the bags on the dock supported conveyor and operate the machines to deposit the bags in the vehicle 14. The machines can readily be controlled to avoid dropping the bags further than the 24 inch limitation prescribed by the Post Office Department.

As disclosed in my said application Ser. No. 694,151 the bags 14 may also be loaded onto the conveyor 38 to form load units in different patterns of orientation; that is, instead of the bags 14 extending longitudinally of the vehicle, the bags may be disposed to extend transversely of the vehicle or at random but closely spaced positions with respect to each other, which relative positions are maintained during further handling of the bags by operating the conveyors 38, carriages 40 and their load supports 43, 330 or 380 in the manner already suggested to deposit the bags in stacks on the floor of the vehicle, except that the individual bag layers making up the stacks are laid down during a continuous rearward movement of the carriage 40 with respect to the vehicle at a rate equivalent to the discharging speed of the load supports 43, 330 or 380. The initial positioning and orientation of the bags in all forms of the invention is the indicated closely spaced relation to obtain maximum utilization of available storage space within the vehicle when fully loaded as herein disclosed.

The bag stacking arrangements of this invention will load trucks and trailers in a fraction of the time now required and at less than half the cost, while at the same time greatly reducing the effort required by workers handling the bags. This not only greatly reduces the tie up time for each truck, but also significantly reduces the over-all cost of mail bag handling.

While many of the herein disclosed specific embodiments and methods are concerned with the loading of the mail bags into the highway vehicle in such a manner that the bags will extend longitudinally of the vehicle, this feature is optional though preferred as it comports with the way the bags are oriented in their final loaded position following the manual and semi-manual conventional procedures that have heretofore been referred to. However, the loading arrangments suggested by FIGURES 19–21 of my said application achieve the same objects insofar as compactness of loading is concerned, and the random positioning of FIGURES 19 and 20 of said application is preferable where the bags vary widely in size throughout the load. As to all described embodiments and methods herein disclosed, the load units or tiers formed on the loading dock are termed "partial transport vehicle load depth unit" in the appended claims.

The foregoing description and the drawings are given merely to explain and illustrate my invention since those skilled in the art who have my disclosure before them will be able to make modifications and variations therein without departing from the scope of the invention.

I claim:
1. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor mounted on the loading dock adjacent but spaced from the load receiving position of the vehicle and having a width transversely thereof approximately the width of the vehicle area, said conveyor being positioned to be aligned with the vehicle and its end opening in the load receiving position of the vehicle, said conveyor presenting an upwardly facing load transporting surface at an elevation for convenient manual lifting of the bags from the dock onto the conveyor surface, a frame mounted on the loading dock between the load receiving position of the vehicle and said conveyor, a trackway supported by said frame and extending longitudinally of said conveyor, with the vehicle having mounted therein a trackway adapted to be aligned with said frame trackway when the vehicle is disposed in said load receiving position;

said trackways having an elevation approximating the ceiling height of the vehicle when the latter is in its said position, a mail bag receiving carriage operating on said trackways, when the vehicle is in said load receiving position and proportioned to enter said vehicle end opening, said carriage having suspended therefrom a load support approximating the width of the vehicle area, means for moving said carriage between a mail bag receiving position adjacent said conveyor and predetermined mail bag discharging positions within the vehicle, means for adjusting vertically said carriage load support to respectively receive and discharge mail bags at said positions of said carriage, and means for discharging from said carriage load support bags received thereon from said conveyor, whereby mail bags may be loaded onto said conveyor load support with the bags thereof oriented to be disposed in closely spaced tier forming relation, and said tier of bags may be mechanically transferred between said conveyor surface and a stack forming position in said vehicle area while maintaining said orientation.

2. The apparatus set forth in claim 1 wherein said means for adjusting vertically said carriage load support comprises:

cable means connecting said load support to said carriage for suspending same therefrom, and power means for winding up and unwinding said cable means to raise and lower said load support relative to said trackways.

3. The apparatus set forth in claim 2 wherein said load support comprises:

an endless conveyor and means for driving same, the last mentioned means comprising said means for discharging the bags from said load support.

4. The apparatus set forth in claim 2 wherein said load support comprises:

a platform, a pusher plate reciprocably mounted on said platform, and means for reciprocating said pusher plate longitudinally of said platform, said pusher plate and said means for moving same comprising said means for discharging the bags from said load support.

5. The apparatus set forth in claim 4 wherein said means for reciprocating said pusher plate comprises lazy tong means and power means for extending and retracting same.

6. The apparatus set forth in claim 4 wherein said means for reciprocating said pusher plate comprises endless chain means operably mounted on said platform at either end of said pusher plate, said pusher plate being connected to one run of each of said chain means, and means for driving said chain means to move said pusher plate longitudinally of said platform.

7. The apparatus set forth in claim 2 wherein said cable means comprises:

separate cables on either side of said load support and carriage extending between the forward ends thereof and separate cables on either side of said load support and carriage extending between the rearward ends thereof, said cables being anchored at their lower ends to said load support, a reel device journalled in said carriage, with the upper ends of said cables being anchored to said reel device, and means for driving said reel device.

References Cited

UNITED STATES PATENTS

| | | |
|---|---|---|
| 2,685,972 | 8/1954 | Eisenhard et al. |
| 2,730,249 | 1/1956 | Edwards. |
| 2,772,794 | 12/1956 | Cramer et al. |
| 2,828,876 | 4/1958 | Parnie. |
| 3,402,834 | 9/1968 | Kelsey. |

FOREIGN PATENTS

| | | |
|---|---|---|
| 66,113 | 8/1914 | Austria. |

GERALD M. FORLENZA, Primary Examiner

R. J. SPAR, Assistant Examiner

U.S. Cl. X.R.

214—41, 75, 514, 730